United States Patent [19]

Igaki et al.

[11] Patent Number: 4,820,918
[45] Date of Patent: Apr. 11, 1989

[54] OPTICAL ENCODER INCLUDING TRANSPARENT SUBSTRATES HAVING FORMED INDICATORS THEREIN

[75] Inventors: Masahiko Igaki; Masahiro Rachi, both of Tokyo; Tomohiro Maekawa, Yokohama, all of Japan

[73] Assignee: Canon Kabushiki Kaisha, Tokyo, Japan

[21] Appl. No.: 878,430

[22] Filed: Jun. 25, 1986

[30] Foreign Application Priority Data

| | | | |
|---|---|---|---|
| Jun. 28, 1985 | [JP] | Japan | 60-143129 |
| Jun. 28, 1985 | [JP] | Japan | 60-143130 |
| Jul. 1, 1985 | [JP] | Japan | 60-144211 |
| Jul. 1, 1985 | [JP] | Japan | 60-144212 |
| Jul. 1, 1985 | [JP] | Japan | 60-144213 |
| Jul. 1, 1985 | [JP] | Japan | 60-144214 |
| Jul. 1, 1985 | [JP] | Japan | 60-144215 |

[51] Int. Cl.⁴ .................................. G01D 5/34
[52] U.S. Cl. ...................... 250/231 SE; 250/237 G
[58] Field of Search ............ 250/231 SE, 237 G, 227; 340/347 P; 356/395; 33/125 C

[56] References Cited

U.S. PATENT DOCUMENTS

| | | | |
|---|---|---|---|
| 3,514,618 | 5/1970 | Seward | 250/233 |
| 3,598,493 | 8/1971 | Fisher | 356/152 |
| 3,714,491 | 1/1973 | McIntyre et al. | 357/30 |
| 3,770,970 | 11/1973 | Trump | 250/231 SE |
| 3,815,125 | 6/1974 | May et al. | 340/47 P |
| 3,833,901 | 9/1974 | Fowler | 340/347 P |
| 4,093,853 | 6/1978 | Hunt | 250/231 SE |
| 4,221,963 | 9/1980 | Fushimi | 250/231 SE |
| 4,224,514 | 9/1980 | Weber | 250/231 SE |
| 4,417,141 | 11/1983 | Phillips | 250/231 SE |
| 4,436,398 | 3/1984 | Endo et al. | 354/476 |
| 4,462,660 | 7/1984 | Crahay | 350/274 |
| 4,496,835 | 1/1985 | Boella et al. | 250/231 SE |
| 4,536,650 | 8/1985 | Carena et al. | 250/231 SE |

FOREIGN PATENT DOCUMENTS

| | | |
|---|---|---|
| 0067706 | 6/1982 | European Pat. Off. |
| 1367868 | 3/1973 | United Kingdom |
| 2056660 | 8/1978 | United Kingdom |

Primary Examiner—David C. Nelms
Assistant Examiner—William L. Oen
Attorney, Agent, or Firm—Fitzpatrick, Cella, Haper & Scinto

[57] ABSTRACT

An optical encoder comprising: an optical scale having a light-transmitting portion and a non-transmitting portion the non-transmitting portion being composed of a slanted face an incident angle of incoming light to which is set larger than the critical angle, the both portions being alternately formed on a protruding mark area formed on a part of a translucent member; light projecting device for illuminating the optical scale; and photoelectric converting device for converting the light, modulated by the optical scale, into electrical signal.

27 Claims, 15 Drawing Sheets

OPTICAL ENCODER INCLUDING TRANSPARENT SUBSTRATES HAVING FORMED INDICATORS THEREIN

BACKGROUND OF THE INVENTION

1. Field of the Invention

The present invention relates to an optical encoder, and in particular to an optical encoder utilizing an optical grating as an optical scale.

2. Related Background Art

In information equipment such as an electronic typewriter, optical encoders are commonly employed for detecting the position and speed of moving parts such as carriages. Such an optical encoder is usually fixed on the moving part, and is so constructed as to project light onto an optical scale on which optical codes are recorded, and to photoelectrically convert thus modulated light with a photodetector through a fixed scale thereby obtaining the information on the position of said moving part as an encoded electrical signal. Said optical scale has been composed of:

(I) a metal plate in which slits are etched; or
(II) a transparent substrate such as glass or plastic on which a metal layer such as of silver, copper, chromium or aluminum is deposited by evaporation and is etched to form slits.

Such conventional optical scales are however not suitable for recording very fine code patterns since the slit width obtainable with etching is limited to about twice the metal layer thickness. Also they are inevitably expensive as they require a complex manufacturing process and involve the use of expensive photosensitive resin for etching.

On the other hand, optical scales not associated with such drawbacks and optical encoders utilizing such optical scales have been proposed for example in the U.S. Pat. Nos. 3,598,493 or 4,536,650, as will be explained in the following.

FIGS. 1 and 2 illustrate a conventional optical encoder, wherein FIG. 1 is a plan view of an optical scale while FIG. 2 is a schematic cross-sectional view thereof. The optical scale 50 is composed of a transparent member having mutually parallel faces 51, 52, and, on the face 51 there are alternately formed flat light-transmitting portions 55 and non-transmitting portions 54 composed of V-sectioned recesses. Among the light coming from an unrepresented light source, the light L2 entering said non-transmitting portion 54 is totally reflected by the sloped surfaces and returns to the incoming direction. On the other hand, the light L1 entering the transmitting portion 55 passes said optical scale 50 and is photoelectrically converted by a photoreceptor 56. Consequently a relative displacement of said photoreceptor 56 and the optical scale 50 causes the photoreceptor 56 to generate pulse signals corresponding to the amount of said displacement.

However, in such a conventional optical encoder, it has been difficult to produce the optical scale with satisfactory precision. For example, the optical scale 60 shown in FIG. 1 can be produced by first preparing a master of the same shape, then preparing an inverted mold from said master, and molding a transparent material with said inverted mold. Said master is usually prepared by forming recesses with a V-shaped punch on a metal plate. However the final form is often distorted from the design shown in FIG. 2 because of mechanical stress applied to the metal plate in the preparation of the master, and such distortion in the preparation gives rise to an aberration in the behavior of the incident light, thus leading to deterioration of the quality of the signal obtained from the photoreceptor. Also, even if the optical scale is prepared in the ideal form, the diffraction of light occuring at the edge of the recesses causes scattering in the light transmitted by the scale, thus lowering the S/N ratio of the detected signal. In FIG. 1, 53 indicates a mark for detecting a home position, formed in the same manner as the non-transmitting portions.

SUMMARY OF THE INVENTION

The object of the present invention is to provide an optical encoder not associated with the aforementioned drawbacks of the prior technology, thus to obtain a signal with a high S/N ratio The above-mentioned object can be achieved, according to the present invention, by an optical encoder comprising an optical scale alternately having light-transmitting portions and non-transmitting portions, composed of slanted faces having an incident angle to the incoming light larger than the critical angle, wherein both said portions are formed on a protruding mark bearing area formed on a part of a translucent member; light projecting means for illuminating said optical scale; and photo-electric converting means for converting the light modulated by said optical scale into an electrical signal.

In another aspect of the present invention, the above-mentioned object can be achieved by an optical encoder comprising an optical scale alternately having light-transmitting portions composed of refractive faces for converging the incident light and non-transmitting portions composed of slanted faces of an incident angle to the incident light larger than the critical angle, both formed on the surface of a translucent member; light projecting means for illuminating said optical scale; and photoelectric converting means for converting the light modulated by said optical scale into an electrical signal.

DETAILED DESCRIPTION OF THE PREFERRED EMBODIMENTS

Now the present invention will be explained in detail by embodiments thereof shown in the attached drawings.

Figure 3:
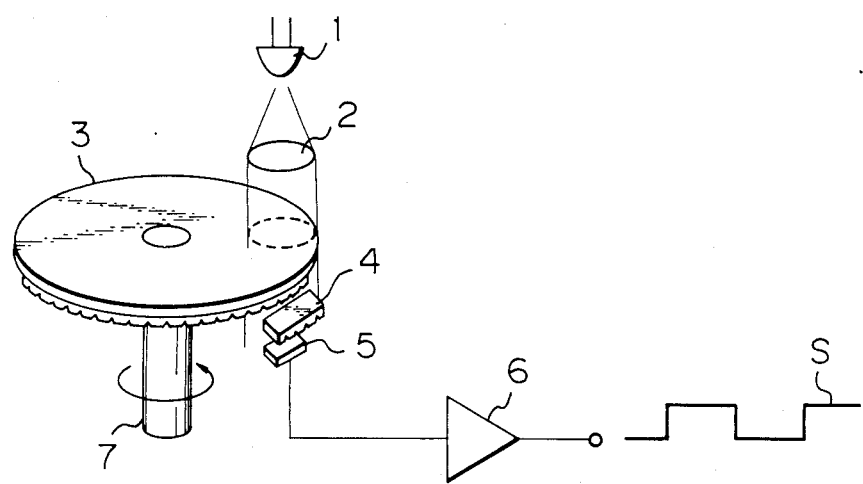
FIG. 3 is a perspective view of a first embodiment of the optical encoder of the present invention.

FIG. 3 is a perspective view of a first embodiment of the optical encoder of the present invention, wherein provided are a light source 1; a collimating lens 2; a rotary optical scale 3 of the present invention fixed on and rotated by a shaft 7; a fixed scale 4 composed of a transparent member; a photoreceptor 5 for converting the light transmitted by said fixed scale 4 into an electrical signal; and a wave-shaping circuit 6 for shaping the signal from the photoreceptor 5 into a form S shown at the right-hand end.

Figure 4A:
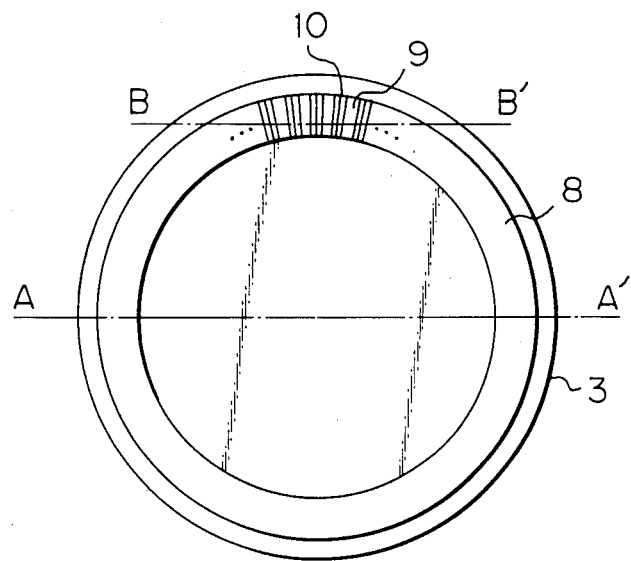
FIGS. 4A and 4B are a plan view and a schematic cross-sectional view of an optical scale to be employed in said first embodiment.
Figure 4B:
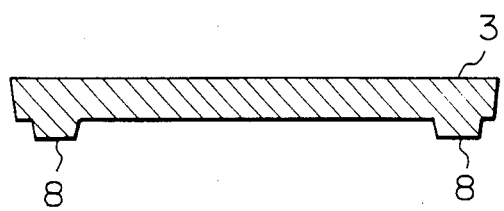

FIGS. 4A and 4B illustrate the structure of said optical scale 3, wherein FIG. 4A is a view seen from below while FIG. 4B is a schematic cross-sectional view along a line A—A' in FIG. 4A. The optical scale 3 is composed of a transparent member such as glass or plastics and is provided with a protruding mark bearing area 8 along or near the periphery of the lower face. On said mark area 8 there are alternately formed light-transmitting portions 9 and non-transmitting portions 10 for modulating the incident light as shown in FIG. 3.

Figure 5:
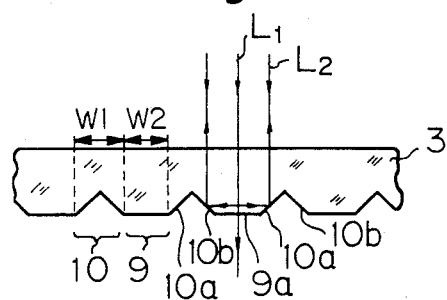
FIGS. 5, 6A and 6B are schematic cross-sectional views of an optical scale showing the principle of signal detection in said first embodiment.

FIG. 5 is a partial cross-sectional view along a line B—B' in FIG. 4A. Said light-transmitting portion 9 is composed, for example, of a flat face 9a of which the incident angle to the incoming light is smaller than the critical angle. On the other hand, the non-transmitting portion 10 is composed of slanted faces 10a, 10b of which the incident angle to the incoming light L2 is selected larger than the critical angle. As an example the faces 10a and 10b form an angle 90°, and the horizontal width W1 of the faces 10a, 10b (width of the projection of said slanted faces onto a plane perpendicular to the optical axis of the incident light) is selected equal to the width W2 of the flat face 9a. As illustrated, the light incident on the slanted face 10a with an incident angle of 45° is totally reflected in a perpendicular direction, and is then incident on the other slanted face 10b with an incident angle of 45° and is again totally reflected in a perpendicular direction to return to the incoming direction. In a similar manner light incident on the slanted face 10b also returns to the incoming direction. On the other hand, the light entering the flat face 9a is transmitted. Thus the flat faces alone function as slits. Consequently this optical scale 3 is equivalent to a slit plate in which the slits and non-transmitting portions are of a same width. Also said fixed scale 4 has the same structure as the optical scale 3 (FIGS. 6A and 6B).

Figure 6A:
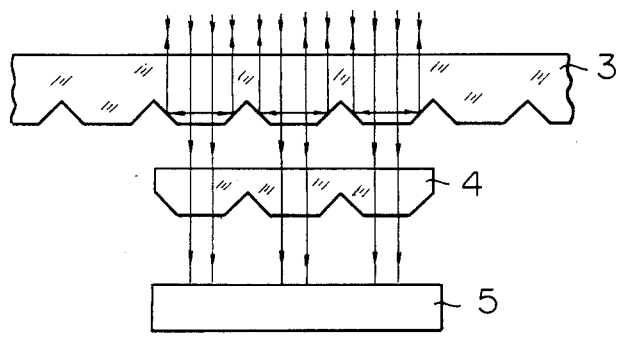
Figure 6B:
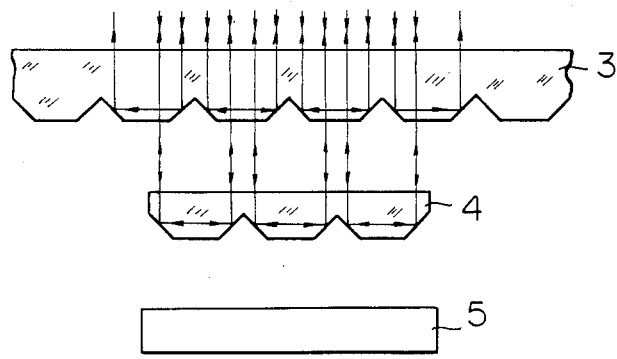

Now reference is made to FIGS. 3, 6A and 6B for explaining the working principle of the optical encoder of the present invention. FIGS. 6A and 6B are schematic cross-sectional views of the optical scale 3, fixed scale 4 and photoreceptor 5, wherein FIG. 6A shows a state in which the marks formed on the optical scale 3 and the fixed scale 4 are matched in phase, while FIG. 6B shows a state in which said marks are displaced in phase by a half cycle. In FIG. 3, the light from the light source 1 is made parallel by the collimating lens 2 and enters the optical scale 3 from above. Said light is transmitted through the flat faces of the optical scale 3, but, in the slanted faces, is not transmitted due to total reflection. Consequently there is formed a regular light-shadow distribution by the light transmitted by the optical scale 3. As the optical scale 3 is rotated by the shaft 7 in a direction indicated by an arrow, said light-shadow distribution also rotates in the same direction. Since the fixed scale 4 and the optical scale 3 have marks of a same pitch, the light transmitted by the optical scale 3 is also transmitted by the fixed scale 4 when both marks are mutually in phase as shown in FIG. 6A. Thus the amount of light received by the photoreceptor 5 becomes maximum in this state. On the other hand, when both marks are mutually displaced by a half cycle as shown in FIG. 6B, the flat face of one scale is opposed to the slanted face of the other scale, so that any light transmitted by the optical scale 3 is reflected twice on the slanted faces of the fixed scale 4 to return to the incoming side. Thus the amount of light received by the photoreceptor 5 becomes minimum.

Between said two states of maximum and minimum light reception, the flat face of the optical scale 3 partially coincides with that of the fixed scale 4, so that the amount of light received by the photoreceptor 5 is proportional to such coincidence. Consequently the photoreceptor 5 generates a sinusoidal wave signal, which is shaped into a pulse S as shown in FIG. 3, by means of the wave-shaping circuit 6.

The above-explained non-transmitting portion can be obtained by forming a V-shaped or trapezoidal groove of desired width and depth on the mark bearing area of the translucent member. In the present invention, since the mark bearing area is protruding as shown in FIG. 4B, slanted faces can be easily formed only in said mark area, by making grooves on the surface of said mark area with mechanical means such as a bite. Also in the case of producing the optical scale of the present invention by injection or compression molding, a master mold for said molding can be easily obtained by such mechanical means. In this case the optical scale can be produced by preparing a master in the same way the optical scale as shown in FIGS. 4A and 4B, then preparing a female mold for example by nickel electroplating, and plastic molding on said nickel mold.

Figure 1:
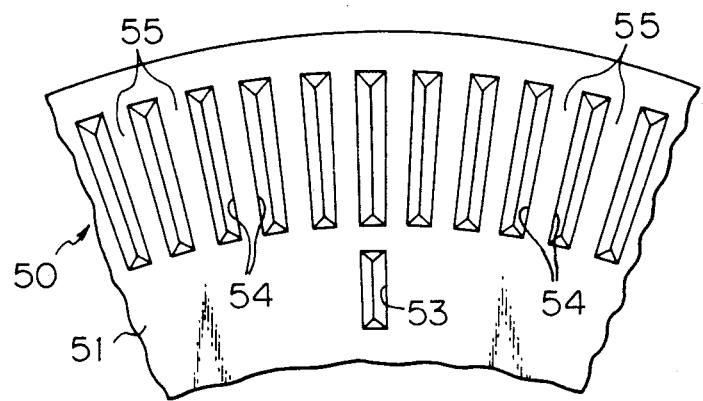
FIGS. 1 and 2 are respectively a plan view and a schematic cross-sectional view of a conventional optical encoder.
Figure 2:
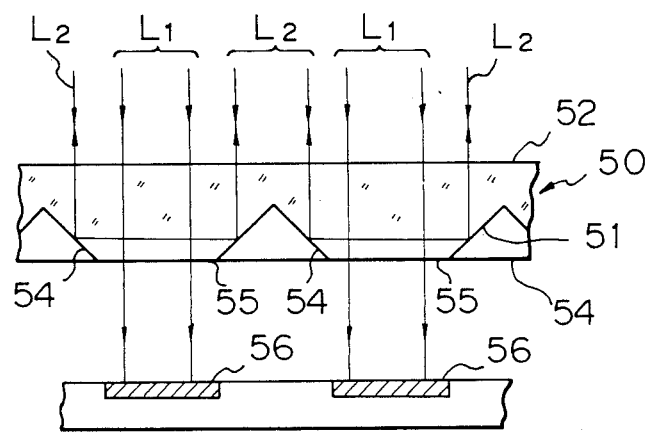
Figure 7A:
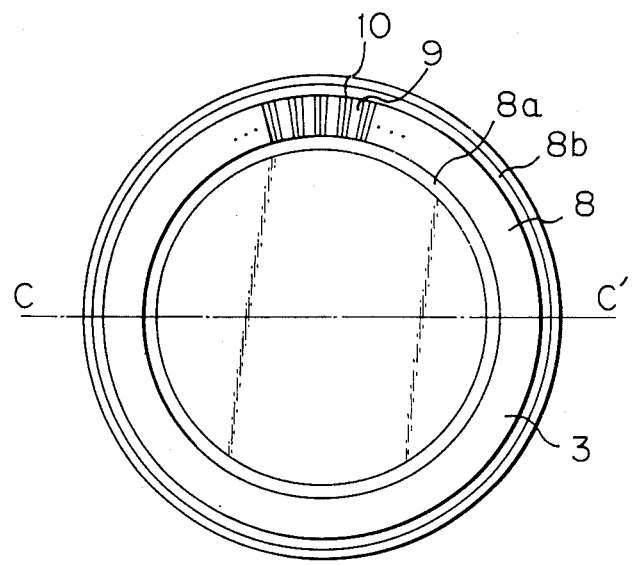
FIGS. 7A and 7B are respectively a plan view and a schematic cross-sectional view of a variation of the optical scale to be employed in the first embodiment.
Figure 7B:
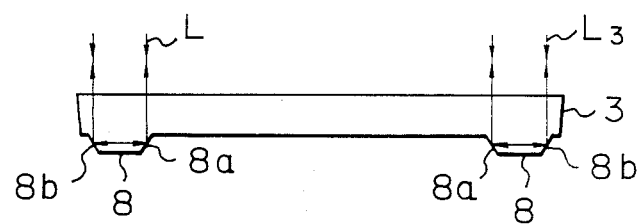
Figure 8A:
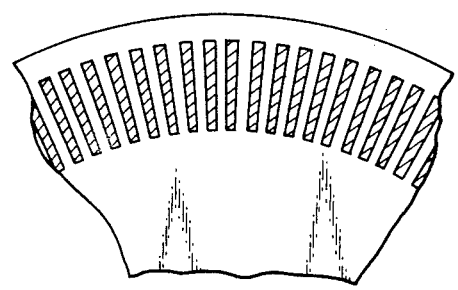
FIGS. 8A and 8B are schematic views showing light-shadow patterns obtained respectively in the conventional optical scale and the optical scale shown in FIG. 7.
Figure 8B:
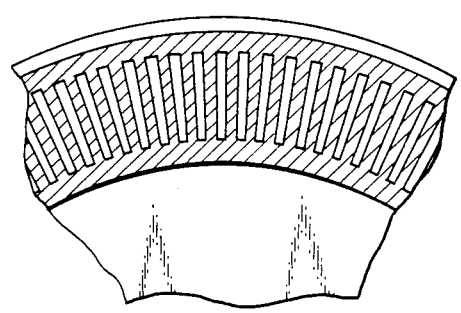

FIGS. 7A and 7B illustrate a variation of said first embodiment, wherein FIG. 7A is a view seen from below, and FIG. 7B is a schematic cross-sectional view along a line C—C' in FIG. 7A, wherein the same components as those in FIGS. 4A and 4B are represented by the same numbers and will not be explained further. This variation is different from the embodiment shown in FIGS. 4A and 4B in that lateral faces 8a, 8b of the mark bearing area 8 are so formed as to have an incident angle to the incoming light larger than the critical angle. For example, when said lateral faces 8a, 8b mutually form an angle of 90°, the incident light L3 is totally reflected on said lateral faces 8a, 8b and returns to the incoming side. FIG. 8A shows the pattern of the non-transmitting portions, indicated by hatched areas, in the conventional structure shown in FIG. 1, while FIG. 8B shows said pattern in the present embodiment, which thus provides a signal of a higher S/N ratio from the transmitted light, due to reduced stray light coming from areas other than the mark area.

Figure 9A:
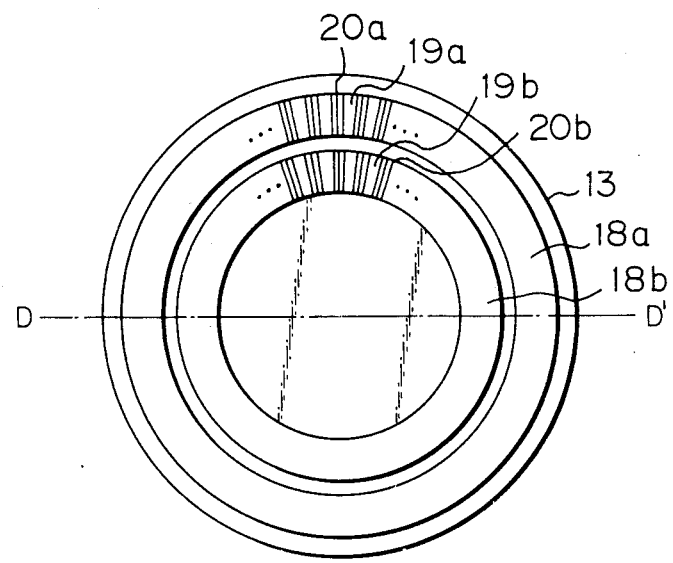
FIGS. 9A and 9B are respectively a plan view and a schematic cross-sectional view of another variation of the optical scale to be employed in the first embodiment.
Figure 9B:
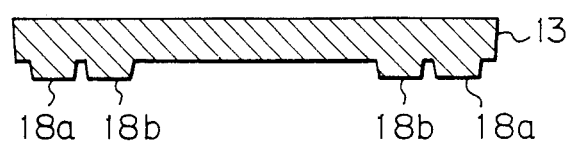

FIGS. 9A and 9B illustrate another variation of the first embodiment wherein FIG. 9A is a view seen from below while FIG. 9B is a schematic cross-sectional view along a line D—D' in FIG. 9A. An optical scale 13 is provided with two protruding mark bearing areas 18a, 18b in double rings, respectively having light-transmitting portions 19a, non-transmitting portions 20a and light-transmitting portions 19b, non-transmitting portions 20b at different pitches. This embodiment is also easy to prepare as in the foregoing embodiment, and further provides detection of different signals with a single optical scale.

Figure 10:
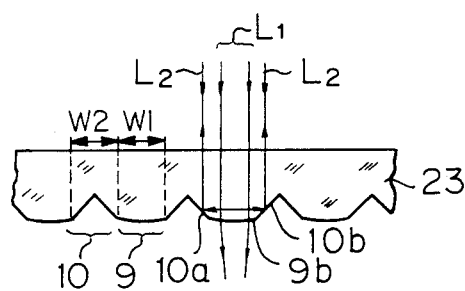
FIGS. 10, 11A, 11B and 12 are schematic cross-sectional views showing a second embodiment of the present invention.
Figure 11A:
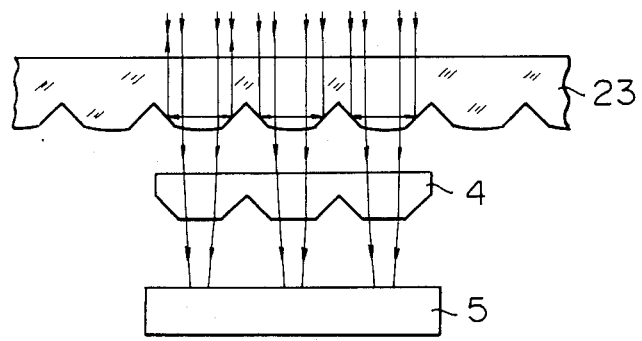
Figure 11B:
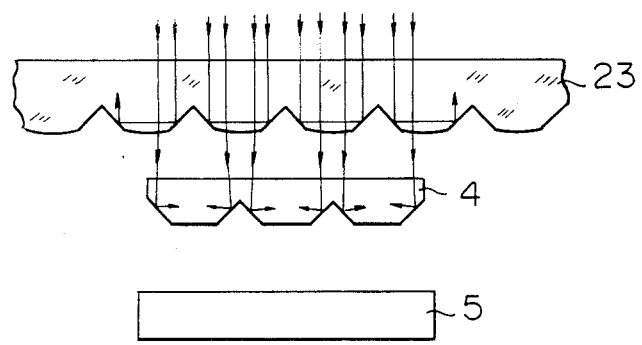

FIG. 10 is a schematic cross-sectional view of an optical scale to be employed in a second embodiment of the present invention, in which the light source and the photoreceptor are constructed identical with those in the first embodiment shown in FIG. 3.

A light-transmitting portion 9 of the optical scale 23 is composed of a convex refractive face 9b of incident angles to the incoming light L1 smaller than the critical angle, thus transmitting the incoming light in a converged state. On the other hand, a non-transmitting portion 10 is composed of slanted faces 10a, 10b of an incident angle to the incoming light L2 larger than the critical angle. For example, if the slanted faces 10a, 10b form an angle of 90°, light incident on the slanted face 10a with an incident angle of 45° is totally reflected to a perpendicular direction, is incident on the other slanted face 10b with an incident angle of 45°, and is again totally reflected to return to the incoming side. The light incident on the slanted face 10b is similarly reflected and returns to the incoming side.

In this manner the refractive portion 9b alone functions as a slit. Consequently this optical scale 23 can be used in the same manner as the conventional optical scale in which slits and non-transmitting portions regularly alternate. In the conventional optical scale, however, the incoming light may be diffracted at the edges of the non-transmitting portion, whereby the area illuminated by the transmitted light may become wider than what is desired. On the other hand, the optical scale of the present embodiment, in which the light-transmitting portion is formed as a convex lens, is capable of limiting the above-mentioned spreading of the transmitted light, thus improving the efficiency of utilization of light. Also there can be expected an advantage of obtaining a light signal of enhanced contrast, since light is concentrated in the high-intensity portion of the modulated light.

Figure 12:
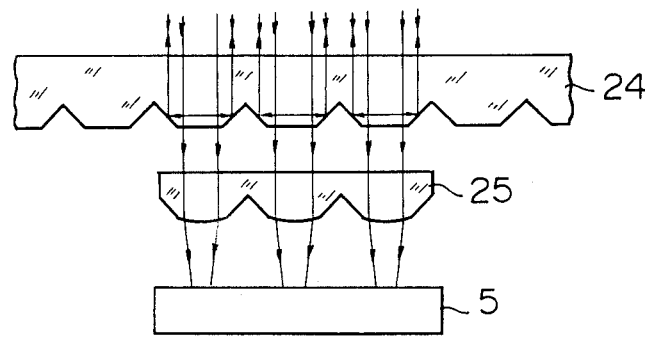

In the present embodiment, as shown in FIG. 12, an optical scale with light-transmitting portions of converging function may be utilized in the fixed scale 25 instead of the optical scale 24 moving with the movable part to be inspected.

Figure 13:
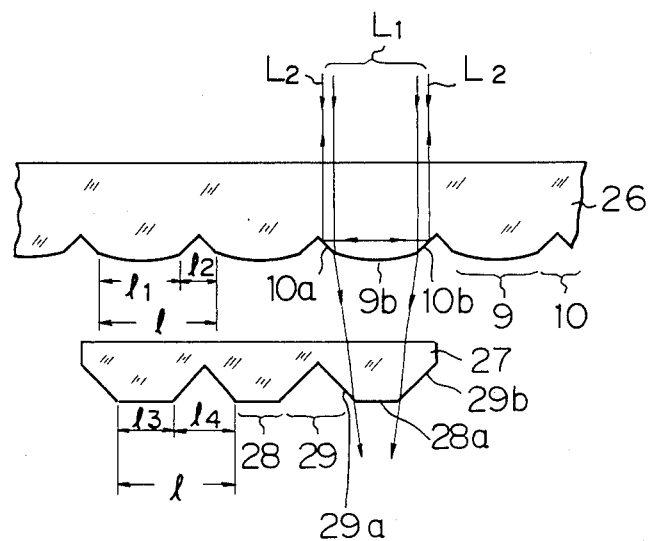
FIG. 13 is a schematic cross-sectional view of an optical scale constituting a variation of the second embodiment.

FIG. 13 is a schematic cross-sectional view of a variation of said second embodiment, wherein a light-transmitting portion 9 of the optical scale 26 is composed of a convex refractive face 9b, having incident angles to the incoming light L1 smaller than the critical angle thereby converging said light L1. On the other hand, a non-transmitting portion 10 is composed of slanted faces 10a, 10b of an incident angle to the incoming light L2 larger than the critical angle. Also the fixed scale 27 is composed of a translucent member having light-transmitting portions 28 composed of flat faces 28a and non-transmitting portions 29 composed of slanted faces 29a, 29b of an incident angle to the incoming light larger than the critical angle, both said portions being formed.

FIG. 14 shows the wave form of the detected light signal obtained in the embodiment shown in FIG. 13. A desired wave form can be obtained by varying the ratio of widths of light-transmitting portions and of non-transmitting portions in the optical scale 26 and the fixed scale 27 as shown in FIG. 13. For example, by selecting the width $l1$ of the light-transmitting portion 9 of the optical scale 26 larger than the width $l2$ of the non-transmitting portion, the widths $l'3$, $l'4$ of the lighted and shadow patterns formed on the fixed scale 27 by the light beams converged by the refractive faces 9b can be made mutually equal. Consequently the photoreceptor detecting the light transmitted by the fixed scale 27 releases a pseudo sinusoidal wave as shown in FIG. 14A, so that the pulse after wave shaping attains an ideal state in which the duration $t2$ of the high-level state (H) is the same as the duration $t1$ of the low-level state (L), as shown in FIG. 14B. In this state the length $l$ of a cycle of light-transmitting and non-transmitting portions is the same in the optical scale 26 and in the fixed scale 27, and the width of the light-transmitting portion 28 of the fixed scale 27 is equal to $l3$ $(=l'3)$ while that of the non-transmitting portion 29 is equal to $l4$ $(=l'4)$.

Figure 14A:
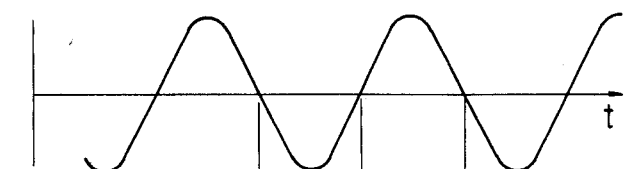
FIGS. 14A to 14D are waveform charts showing signals detected in the embodiment shown in FIG. 13.
Figure 14B:
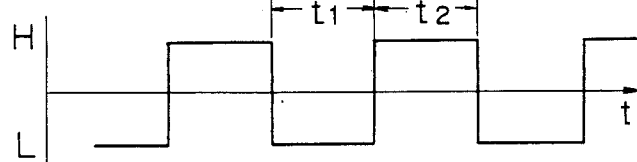
Figure 14C:
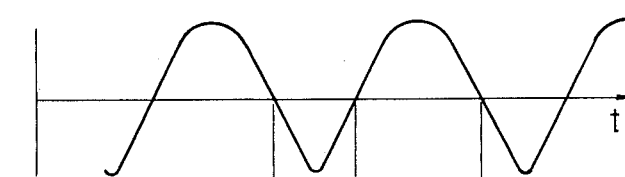
Figure 14D:
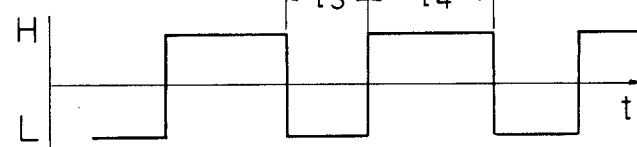

On the other hand, under a condition $l1=l2=l3=l4$, the light-shadow pattern formed by the optical scale 26 on the fixed scale 27 will have a characteristic $l'3<l'4$. Consequently the output of the photoreceptor will be significantly distorted from the sinusoidal wave, as shown in FIG. 14C. Also the pulse after wave shaping will have the high-level state (H) longer than the low-level state (L) as shown in FIG. 14D and will become inadequate as a control pulse.

Figure 15:
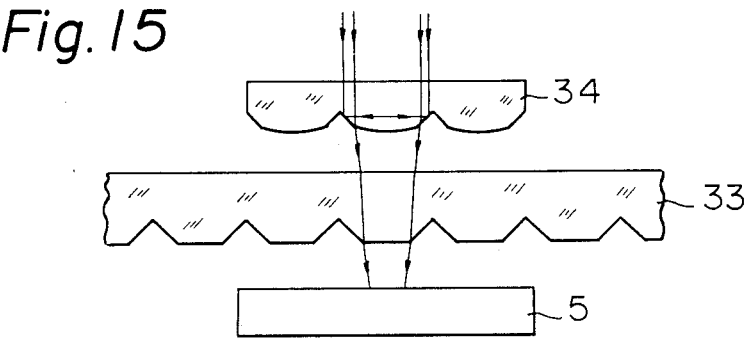
FIG. 15 is a schematic cross-sectional view of another variation of the second embodiment.

As shown in FIG. 15 as another variation of the second embodiment, convex light-transmitting portions may be provided on the fixed scale 34, instead of the optical scale 33 moving with the movable part to be inspected. Also such convex light-transmitting portions may be provided on both scales.

Figure 16:
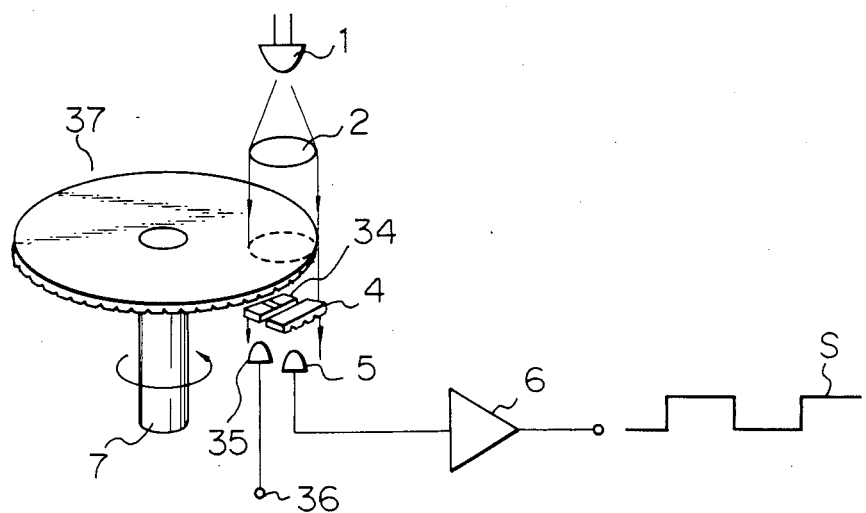
FIGS. 16 and 17 are respectively a plan view and a schematic cross-sectional view of a third embodiment of the present invention.

FIG. 16 is a perspective view showing a third embodiment of the optical encoder of the present invention, wherein shown are a light source 1; a collimating lens 2; a rotary optical scale 37 of the present invention fixed on and driven by a shaft 7; a fixed scale 4 composed of a transparent member; a first photoreceptor 5 for converting the light transmitted by the fixed scale 4 into an electrical signal; a wave-shaping circuit 6 for shaping the signal from the first photoreceptor 5 into a wave form S shown at the right-hand end; a second photoreceptor 35 for receiving a light signal from a home position detecting mark formed on the optical scale 3; and a diaphragm 34 for limiting the light entering the second photoreceptor 35.

Figure 17:
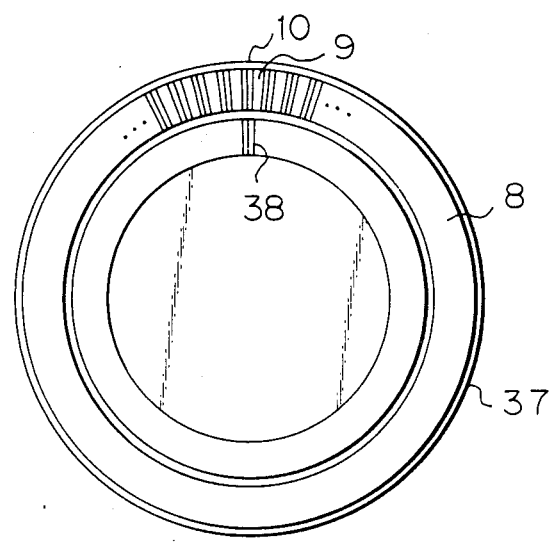

FIG. 17 is a schematic view of said optical scale 37 seen from below. The optical scale 37 is composed of a translucent material such as glass or plastics, and is provided, at the periphery of the lower face thereof, with a protruding mark bearing area 8, on which alternately formed are light-transmitting portions 9 and non-transmitting portions 10 for modulating the illuminating light as shown in FIG. 16. Outside said mark bearing area 8 there is a mark 38 for detecting the home position of the optical scale.

In the above-explained structure, the signal S is obtained by the same principle as already explained in the first embodiment in relation to FIGS. 6A and 6B.

Figure 18:
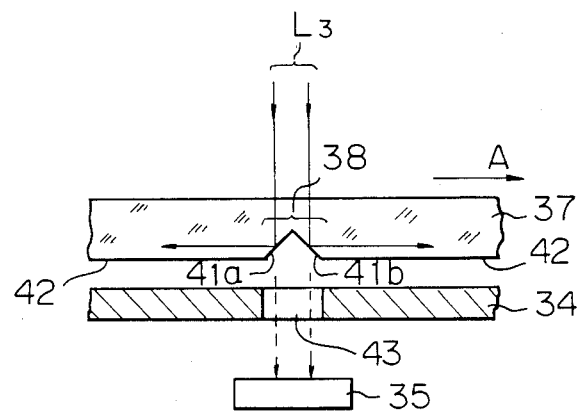
FIG. 18 is a schematic cross-sectional view showing the principle of home position detection in the third embodiment.
Figure 19:
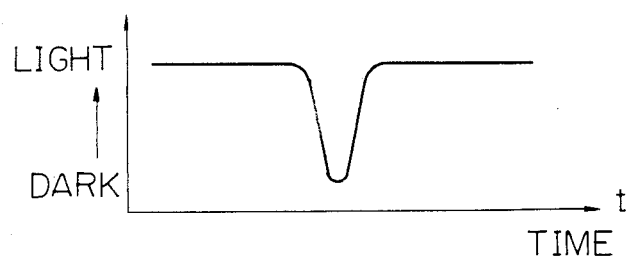
FIG. 19 is a waveform chart showing a home position detection signal in the third embodiment.

Now reference is made to FIGS. 18 and 19 for explaining the principle of home position detection in the present invention. FIG. 18 is a schematic cross-sectional view, showing the home position detecting mark 38 of the optical scale 37, the diaphragm 34 and the second photoreceptor 35. The mark 38 is formed on a part of a flat face 42 of an angle to the incident light smaller than the critical angle, and is composed of slanted faces 41a, 41b of an angle to the incident light larger than the critical angle.

In a state shown in FIG. 18, the light L3 from the light source is totally reflected by the slanted faces 41a, 41b constituting the home position detecting mark 38 and does not reach the second photoreceptor 35. Then, when the optical scale is displaced in a direction A, the flat face 42 becomes positioned between the light source and the second photoreceptor 35, so that the incident light is transmitted by the optical scale 37 and an aperture 43 of the diaphragm 34 and is subjected to photoelectric conversion in the second photoreceptor 45. Consequently the output signal shows a dark state, as shown in FIG. 19, only when the home position detecting mark 38 passes over the aperture 43, and an electrical signal released from a terminal 36 shown in FIG. 16 indicates a detection of the home position of the optical scale 37 in this manner.

In the present embodiment the home position detecting mark bearing is positioned radially inside the mark area, but it may also be positioned radially outside the mark bearing area. Also there may be provided plural detecting marks instead of one. Furthermore, instead of detecting the home position by a negative pulse representing a dark state, the detection may be achieved by a positive pulse obtained by inverting the light-transmitting and non-transmitting areas.

In the foregoing embodiments, the transparent member constituting the optical scale can be conveniently formed by polymethyl methacrylate (PMMA) or polycarbonate (PC). PMMA has a high light transmission and is thermally stable. Also PMMA shows excellent moldability, allowing precise molding of the aforementioned fine structures, as will be explained in the following.

Figure 20A:
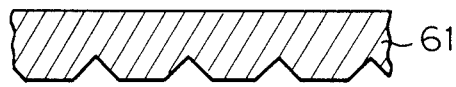
FIGS. 20A to 20D are schematic cross-sectional views showing the process of preparation of the optical scale to be employed in the present invention.
Figure 20B:
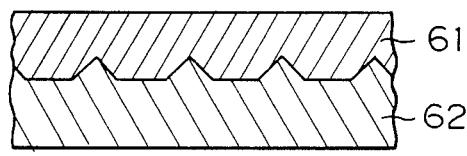
Figure 20C:
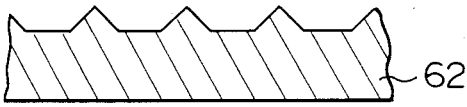
Figure 20D:
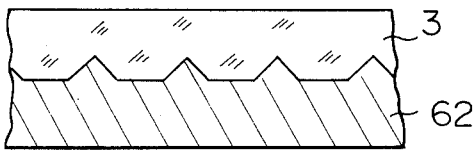

FIGS. 20A to 20D illustrate, in schematic cross-sectional views, the procedure of forming the optical scale. At first a master mold 61 identical with the optical scale is formed for example with a metal plate as shown in FIG. 20A, and an inverted mold 62 is prepared for example by Ni electroforming as shown in FIG. 20B. Then the master is removed as shown in FIG. 20C, and the inverted mold 62 thus obtained is used as a mold for transferring the pattern on a plastic material as shown in FIG. 20D. Said material is then separated from the mold to complete the optical scale 3. In this procedure, if the material has insufficient moldability, the obtained optical scale does not become identical with the master due to deformation for example at the boundary of a flat face and a slanted face, but the use of PMMA permits reproduction of fine patterns without such inconvenience.

On the other hand, polycarbonate (PC) has a high light transmission, a high thermal stability and a relatively high refractive index (n=1.58) and shows an advantage of low stray light, as will be explained in the following.

Figure 21:
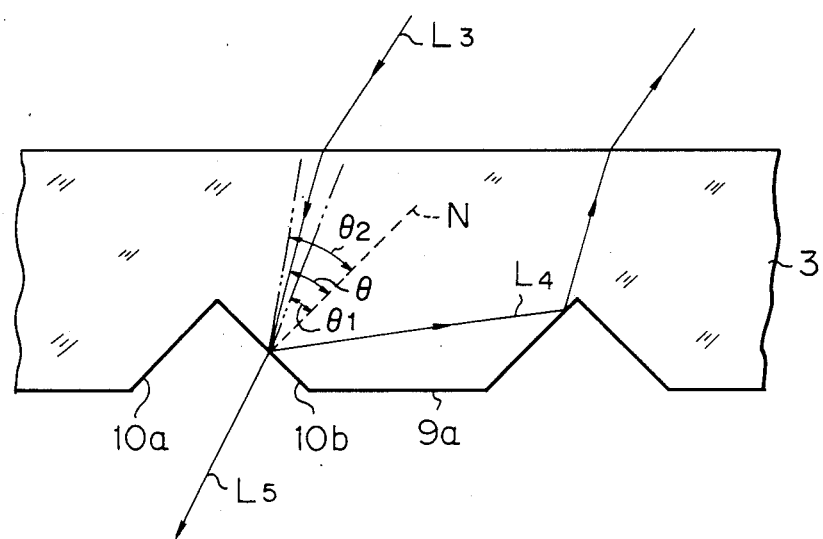
FIG. 21 is a schematic cross-sectional view showing the relationship between the refractive index of the material constituting the optical scale of the present invention and the behavior of the incident light.

FIG. 21 is a partial magnified cross-sectional view of the optical scale. The light perpendicularly entering the optical scale 3 behaves as explained in FIG. 5, but light randomly reflected for example in the light source unit may diagonally enter the optical scale 3. For example, when a light L3 enters the slanted face 10b with an incident angle $\theta$, said angle $\theta$ may become smaller than the critical angle $\theta 2$ if the optical scale 3 is formed with a material of a low refractive index such as ABS resin, so that a part of the light L3 is transmitted to generate stray light L5. However, the optical scale formed with PC shows a critical angle $\theta 1$ smaller than the angle $\theta$, so that the light L3 is totally reflected by the slanted face 10b and is not transmitted by the optical scale 3. In this manner the use of PC provides a large range of incident angle inducing total reflection, thus avoiding stray light formation and allowing signal detection with a high S/N ratio for example in an optical encoder. Also it offers a wider freedom in the design of the light source, due to reduced limitation on the incident angle.

Figure 22A:
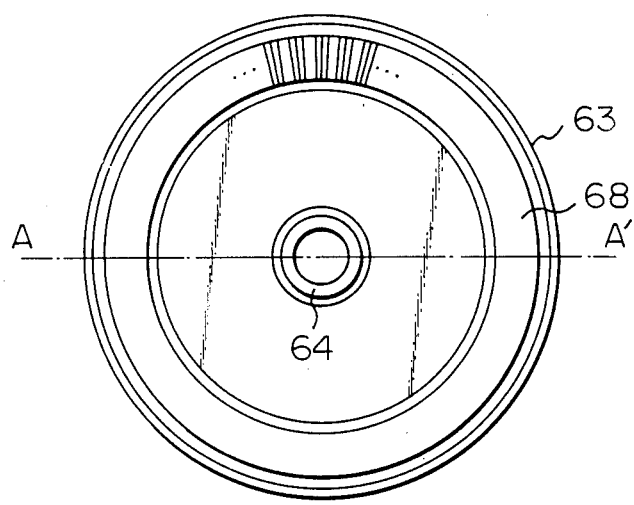
FIGS. 22A and 22B are respectively a plan view and a schematic cross-sectional view showing another embodiment of the optical scale to be employed in the present invention.
Figure 22B:
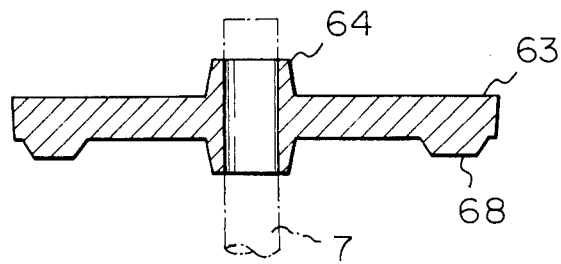

The present invention is not limited to the foregoing embodiments but is further applicable in various purposes. For example, as shown in FIGS. 22A and 22B, the optical scale 63 may be provided not only with a protruding mark bearing area 68 but also with an integral mounting portion 64 for mounting on the rotary shaft 7 or the like. Also the photoreceptor may be so constructed as to detect reflected light instead of transmitted light. Furthermore, the present invention is applicable not only to a rotary optical encoder but also to a linear optical encoder.

Furthermore, though the fixed scale is positioned between the optical scale and the photoreceptor in the foregoing embodiments, said fixed scale may be dispensed with if the photoreceptor has a light-receiving area of a size matching that of the light-transmitting portion of the optical scale.

What is claimed is:

1. An optical encoder comprising:
   light projecting means;
   an optical scale for modulating light projected from said light projecting means, said scale having a translucent part defining a surface and a mark-bearing area protruding from said surface, said scale further having a light-transmitting portion and a non-light-transmitting portion, said non-light-transmitting portion comprising a slanted face having an incident angle to light incident from said light projecting means which is larger than the critical angle, said light-transmitting and non-light-transmitting portions being alternately formed on said protruding mark-bearing area; and
   photoelectric converting means for converting the light, modulated by said optical scale, into an electrical signal, wherein said protruding mark-bearing area has a trapezoidal cross-sectional shape, defining a face which corresponds to a sloped side of said trapezoidal shape and having an incident angle to light incident from said light projecting means which is larger than the critical angle.

2. A optical encoder according to claim 1, further comprising a fixed scale positioned between said light projecting means and said photoelectric converting means and fixed with respect to said photoelectric converting means.

3. An optical encoder according to claim 1, wherein said optical scale further comprises a home position detecting mark formed in a part of said translucent part and comprising a slanted face having an incident angle to light incident from said light projecting means which is set larger than the critical angle.

4. An optical encoder according to claim 1, wherein said optical scale further comprises a connecting portion integrally formed with said mark bearing area for mounting said scale on an object to be inspected.

5. An optical encoder according to claim 1, wherein said translucent part is composed of polymethyl methacrylate.

6. An optical encoder according to claim 1, wherein said translucent part is composed of polycarbonate.

7. An optical encoder comprising:
light projecting means;
an optical scale for modulating light projected from said light projecting means, said scale having a translucent part defining a surface, a light-transmitting portion comprising a convex face providing a lens effect for converging light incident from said light projecting means, and a non-light-transmitting portion comprising a slanted face having an incident angle to light incident from said light projecting means which is larger than the critical angle, said light-transmitting and non-light-transmitting portions being alternatingly formed on said surface of a translucent part; and
photoelectric converting means for converting the light, modulated by said optical scale, into an electrical signal.

8. An optical encoder according to claim 7, further comprising a fixed scale positioned between said light projecting means and said photoelectric converting means and fixed with respect to said photoelectric converting means.

9. An optical encoder according to claim 7, wherein said optical scale further comprises a home position detecting mark formed in a part of said translucent part and comprising a slanted face having an incident angle to light incident from said light projecting means which is set larger than the critical angle.

10. An optical encoder according to claim 7, wherein said optical scale further comprises a connecting portion integrally formed with said mark area for mounting said scale on an object to be inspected.

11. An optical encoder according to claim 7, wherein said translucent part is composed of polymethyl methacrylate.

12. An optical encoder according to claim 7, wherein said translucent part is composed of polycarbonate.

13. An optical encoder comprising:
light projecting means;
a first optical scale having a translucent part defining surface, a plurality of light-transmitting portions, each comprising a refractive face for converging light incident from said light projecting means, and a plurality of non-light-transmitting portions, each comprising a slanted face having an incident angle to light incident from said light projecting means which is larger than the critical angle, said portions being alternatingly formed in a radial arrangement at a predetermined pitch on said surface of said translucent part; and
photoelectric converting means for converting the light, transmitted through and modulated by said first optical scale, into an electrical signal, said converting means having a plurality of light-receiving portions disposed in a radial arrangement at the same pitch as the light-transmitting portions of said first optical scale, the ratio between the length of the light-receiving portion in a direction of the radial arrangement thereof and a distance between two light-receiving portions being different from the ratio between the lengths of the light-transmitting portions and the non-transmitting portions in the direction of the radial arrangement thereof.

14. An optical encoder according to claim 13, further comprising a second optical scale mounted for movement relative to said first optical scale and having a translucent part defining a surface, a plurality of light-transmitting portions and a plurality of non-light-transmitting portions, wherein each of the non-light-transmitting portions of said second optical scale comprises a slanted face having an incident angle to light incident form said light projecting means which is larger than the critical angle, and wherein said light-transmitting and non-light-transmitting portions of said second optical scale are alternatingly formed in a radial arrangement at a predetermined pitch on the translucent part, the ratio of the lengths of the light-transmitting portions to the non-light-transmitting portions of said second optical scale being different from that of said first optical scale.

15. An optical encoder according to claim 14, wherein each light-transmitting portion of said second optical scale comprises a refractive face for converging light incident on said light-transmitting portion.

16. An optical encoder according to claim 13, wherein said first optical scale further comprises a home position detecting mark formed in a portion of said translucent part and comprising a slanted face having an incident angle to light incident from said light projecting means which is larger than the critical angle.

17. An optical encoder according to claim 13, wherein said optical scale further comprises a connecting portion integrally formed with said mark bearing area for mounting said scale on an object to be inspected.

18. An optical encoder according to claim 13, wherein said translucent part is composed of polymethyl methacrylate.

19. An optical encoder according to claim 13, wherein said translucent part is composed of polycarbonate.

20. An optical encoder according to claim 13, wherein said photoelectric converting means comprises a photoreceptor element and a fixed scale, disposed between said photoreceptor element and said first optical scale, and having light-transmitting portions and non-light-transmitting portions alternatingly arranged.

21. An optical encoder comprising:
light projecting means;
a first optical scale having translucent part defining a surface, a light-transmitting portion including a refractive face for converging incoming light and a non-light-transmitting portion including a slanted face having an incident angle to light incident from said light projecting means which is larger than the critical angle, both said portions being alternatingly formed on said surface of a translucent part;

a second optical scale having alternating light-transmitting and non-light-transmitting portions and mounted for movement relative to said first optical scale, the ratio of widths of each light-transmitting portion to that of each non-light-transmitting portion in said second optical scale being different from that of said first optical scale; and photoelectric converting means for converting light, modulated by said first and second optical scales, into an electrical signal.

22. An optical encoder according to claim 21, wherein the light-transmitting portions and the non-light-transmitting portions of said second opticlas scale each comprise a slanted face having an incident angle to light incident form said light projecting means which is larger than the critical angle.

23. An optical encoder according to claim 22, wherein each light-transmitting portion of said second optical scale includes a refractive face for converging the incoming light.

24. An optical encoder according to claim 21, wherein said first optical scale further comprises a home position detecting mark formed in a part of said translucent part and comprising a slanted face having an incident angle to the light incident from said light projecting means which is larger than the critical angle.

25. An optical encoder according to claim 21, wherein said first optical scale further comprises an integrally formed connecting portion for mounting said first scale on an object to be inspected.

26. An optical encoder according to claim 21, wherein said translucent part is composed of polymethyl methacrylate.

27. An optical encoder according to claim 13, wherein said translucent part is composed of polycarbonate.

* * * * *

UNITED STATES PATENT AND TRADEMARK OFFICE
CERTIFICATE OF CORRECTION

PATENT NO. : 4,820,918

DATED : April 11, 1989

INVENTOR(S) : MASAHIKO IGAKI, ET AL.

It is certified that error appears in the above-identified patent and that said Letters Patent is hereby corrected as shown below:

COLUMN 2
    Line 17, change "ratio" to --ratio--.

COLUMN 4
    Line 62, change "way the" to --way as the--.
    Line 63, delete "as".

COLUMN 6
    Line 13, change "translucent" to --transparent--.
    Line 17, change "formed." to --formed alternatingly--.
    Line 27, change "formed on" to --formed from--.

COLUMN 7
    Line 1, change "scale 3;" to --scale 37;--.
    Line 43, delete "bearing"; and change "mark" (second occurrence) to --mark-bearing--.
    Line 45, change "mark bearing" to --mark-bearing--.

UNITED STATES PATENT AND TRADEMARK OFFICE
CERTIFICATE OF CORRECTION

PATENT NO. : 4,820,918

DATED : April 11, 1989

INVENTOR(S) : Masahiko Igaki, et al

It is certified that error appears in the above-identified patent and that said Letters Patent is hereby corrected as shown below:

COLUMN 11

Line 22, change "opticlas" to --optical--.

Signed and Sealed this

Seventeenth Day of July, 1990

Attest:

HARRY F. MANBECK, JR.

*Attesting Officer*   *Commissioner of Patents and Trademarks*